US010407059B2

(12) United States Patent
Sham

(10) Patent No.: US 10,407,059 B2
(45) Date of Patent: *Sep. 10, 2019

(54) AUTOMATED VEHICLE PARKING

(71) Applicant: Wellen Sham, Taipei (TW)

(72) Inventor: Wellen Sham, Taipei (TW)

(73) Assignee: Wellen Sham, Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/812,154

(22) Filed: Nov. 14, 2017

(65) Prior Publication Data

US 2018/0072311 A1    Mar. 15, 2018

Related U.S. Application Data

(63) Continuation of application No. 15/097,293, filed on Apr. 13, 2016, now Pat. No. 9,827,983.

(Continued)

(51) Int. Cl.
*B60W 30/06* (2006.01)
*G01C 21/34* (2006.01)
(Continued)

(52) U.S. Cl.
CPC ......... *B60W 30/06* (2013.01); *B62D 15/0285* (2013.01); *G01C 21/3407* (2013.01);
(Continued)

(58) Field of Classification Search
None
See application file for complete search history.

(56) References Cited

U.S. PATENT DOCUMENTS 9,371,007 B1    6/2016  Penilla et al.
9,827,983 B2 *  11/2017 Sham ................... B60W 30/06
(Continued)

FOREIGN PATENT DOCUMENTS

EP        2207350 A1    7/2010
EP        2772414 A2    9/2014
WO    2013127666 A1    9/2013

OTHER PUBLICATIONS

U.S. Appl. No. 15/097,293, filed Apr. 13, 2016, Non-Final Rejection dated Jun. 17, 2016, all pages.

(Continued)

*Primary Examiner* — Aaron L Troost
(74) *Attorney, Agent, or Firm* — Kilpatrick Townsend & Stockton LLP

(57) ABSTRACT

Systems and methods for automatically parking a vehicle are described including receiving a request from a user to park a vehicle. A database including parking availability information is searched based at least in part on the request and location information associated with the user. An available parking space is determined based on the results of the search, and information related to the available parking space is sent to the user. When confirmation is received from the user indicating that that the vehicle is to be parked in the available parking space, a status of the available parking space is changed to unavailable, and guidance information related to the available space to the user. The vehicle then autonomously navigates to the parking space using the guidance information.

17 Claims, 11 Drawing Sheets

Related U.S. Application Data

(60) Provisional application No. 62/259,613, filed on Nov. 24, 2015.

(51) Int. Cl.

| | | |
|---|---|---|
| *G01S 19/42* | (2010.01) | |
| *G05D 1/00* | (2006.01) | |
| *B62D 15/02* | (2006.01) | |
| *G01C 21/36* | (2006.01) | |
| *G08G 1/14* | (2006.01) | |

(52) U.S. Cl.
CPC .......... *G01C 21/3685* (2013.01); *G01S 19/42* (2013.01); *G05D 1/0088* (2013.01); *G08G 1/146* (2013.01); *G08G 1/148* (2013.01)

(56) References Cited

U.S. PATENT DOCUMENTS

| | | |
|---|---|---|
| 2007/0146165 A1 | 6/2007 | Tanakam |
| 2008/0140286 A1 | 6/2008 | Jung |
| 2012/0188100 A1 | 7/2012 | Min et al. |
| 2012/0256766 A1 | 10/2012 | Lavoie |
| 2013/0085637 A1 | 4/2013 | Grimm et al. |
| 2013/0132270 A1 | 5/2013 | Cheung et al. |
| 2014/0240502 A1 | 8/2014 | Strauss et al. |
| 2014/0320318 A1 | 10/2014 | Victor et al. |
| 2015/0066545 A1 | 3/2015 | Kotecha et al. |
| 2015/0149265 A1 | 5/2015 | Huntzicker et al. |
| 2015/0241241 A1 | 8/2015 | Cudak et al. |
| 2015/0353080 A1 | 12/2015 | Mukaiyama |
| 2016/0068158 A1 | 3/2016 | Elwart et al. |
| 2016/0163122 A1 | 6/2016 | Mandelkow et al. |
| 2016/0362050 A1 | 12/2016 | Lee et al. |
| 2017/0083025 A1 | 3/2017 | Rosas-Maxemin et al. |
| 2017/0144654 A1 | 5/2017 | Sham |
| 2018/0001930 A1 | 1/2018 | Sham |

OTHER PUBLICATIONS

U.S. Appl. No. 15/097,293, filed Apr. 13, 2016, Final Rejection dated Jan. 2, 2017, all pages.
U.S. Appl. No. 15/097,293, filed Apr. 13, 2016, Non-Final Rejection dated Apr. 5, 2017, all pages.
U.S. Appl. No. 15/097,293, filed Apr. 13, 2016, Notice of Allowance dated Jul. 24, 2017, all pages.
European Office Action for EP16194301 dated Apr. 13, 2017, all pages.
U.S. Appl. No. 15/704,283, "Non-Final Office Action", dated Mar. 11, 2019, 11 pages.
EP Office Action dated Feb. 15, 2019 in the corresponding EP application (application No. 16194301.4)

\* cited by examiner

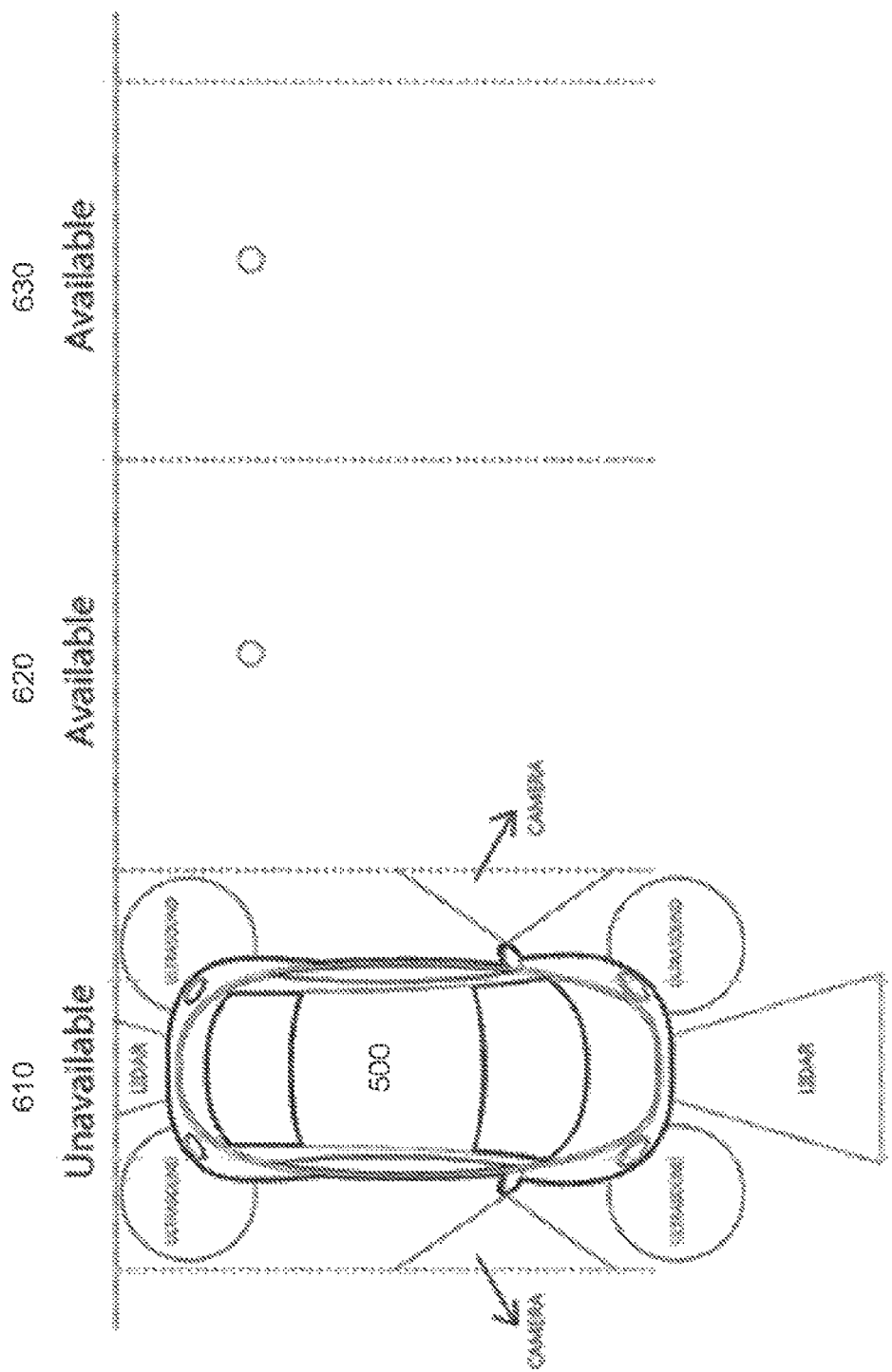

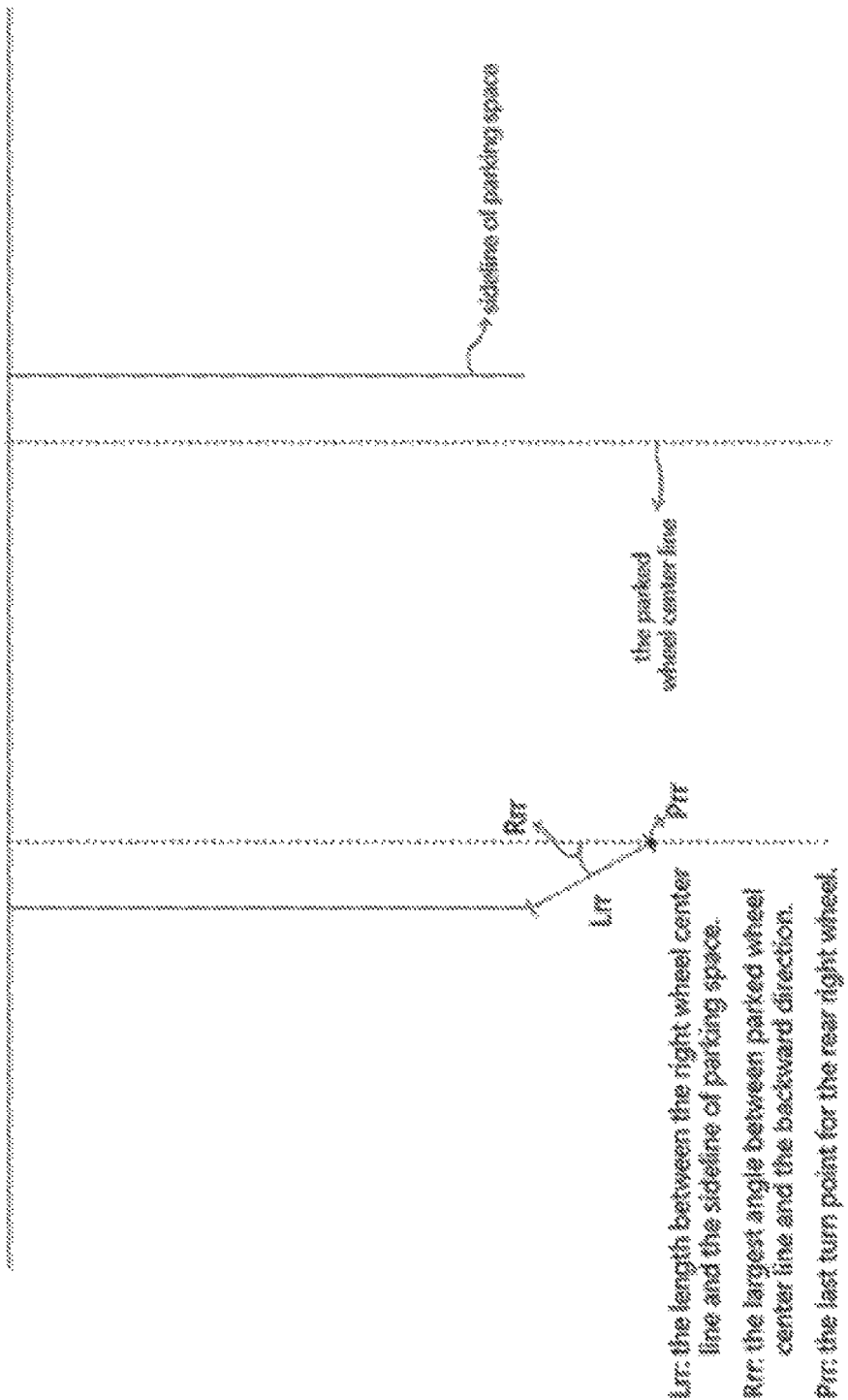

AUTOMATED VEHICLE PARKING

CROSS-REFERENCES TO RELATED APPLICATIONS

The present application is a continuation of U.S. Non-provisional application Ser. No. 15/097,293, filed Apr. 13, 2016, which claims priority to U.S. Provisional Application No. 62/259,613, filed Nov. 24, 2015, the disclosures of which are hereby incorporated by reference in their entirety for all purposes.

BACKGROUND

Exemplary embodiments of the present disclosure relate to automated parking systems and methods that may be used, for example, for motor vehicles, including electric vehicles.

Vehicle operators spend countless hours looking for parking spaces in congested areas. This can be frustrating, time consuming, and (in extreme cases) can even lead to controversies over who has the right to an open parking space.

Parking garages can also present hazards to drivers and pedestrians as vehicles pull out of parking spaces, pedestrians walk behind or in front of moving cars, and drivers exceed safe driving speeds within the garage.

SUMMARY

Exemplary embodiments of the present disclosure may address at least some of the above-noted problems. For example, according to first aspects of the disclosure, systems and methods may be provided that allow users to search for and select nearby available parking spaces using a graphical user interface, and automatically park the car in a selected parking space and/or garage.

According to further aspects of the disclosure, methods of automatically parking a vehicle may include one or more of receiving a request from a user to park a vehicle, the request including location information; searching a database including parking availability information based at least in part on the request and location information; determining an available parking space based on said searching; sending information related to the available parking space to the user; receiving confirmation from the user that the vehicle is to be parked in the available parking space; changing a status of the available parking space to unavailable; and/or sending guidance information related to the available space to the user.

In embodiments, the location information may include GPS coordinates, and/or the search may return results within a predetermined distance of the GPS coordinates.

In embodiments, the search may return a plurality of available parking spaces, and the confirmation may include selection of one of the available parking spaces. In embodiments, the search may return available parking spaces in a plurality of parking structures, and the confirmation may include selection of one of the parking structures.

In embodiments, the guidance information may include at least one of coordinates associated with the available parking space, directions associated with the available parking space, communication link information for a local auto-guidance system associated with the available parking space, sensor and/or beacon identification associated with the available parking space.

Embodiments may also include automatically guiding the vehicle at least partly to the available parking space.

In embodiments, sending information related to the available parking space may include sending at least one of parking space location information, parking facility information, price information, distance information, and/or availability timing information.

Embodiments may also include charging the user a parking fee based at least in part on determining that the vehicle has arrived at the available parking space, determining that the vehicle has left the available parking space, and/or the confirmation from the user that the vehicle is to be parked in the available parking space.

According to further aspects of the disclosure, automatic parking systems may include one or more of a positioning system configured to determine the location of a vehicle; a communication interface configured to receive available parking space information and guidance information; a user interface configured to allow a user to select at least one of an available parking garage or available parking spot; and/or a guidance system configured to drive the vehicle to a parking garage or parking spot selected via the user interface.

In embodiments, the communication system may be further configured to transmit a parking request including location information of the vehicle.

In embodiments, the guidance system may include one or more of a movement sensor, a plurality of cameras, and/or a sensor configured to detect at least one of sound waves, radio waves, or non-visible light waves.

In embodiments, the guidance system may be configured to operate in at least a first mode, e.g. for road driving, and a second mode, e.g. for driving in a parking structure and/or parking the vehicle. In embodiments, the second mode may include interpreting a data category that is not used in the first mode.

In embodiments, the guidance system may be configured to drive the vehicle to the parking garage or parking spot after the user exits the vehicle.

According to further aspects of the disclosure, automatic parking systems may include one or more of a communication interface configured to receive a parking request from a user, the parking request including location information; a parking space availability module including an input for receiving information associated with parking spot availability, and a processor for identifying an available parking spot based at least in part on the location information and the information associated with parking spot availability. In embodiments, the system may be further configured to send information associated with the available parking spot to the user; receive a parking confirmation for a selected parking spot from the user; change a status of the selected parking spot to unavailable; and/or send guidance information for automatically driving a vehicle at least partly to the selected parking spot.

In embodiments, the information associated with parking spot availability may include at least one of images, sound waves, radio waves, and/or non-visible light waves that indicate the presence or absence of a vehicle in a parking space.

In embodiments, the system may be configured to send information associated with a plurality of available parking spaces or structures, and to receive a selection of one of the available parking spaces or structures from the user.

In embodiments, the guidance information may allow the vehicle to be automatically driven in a first mode to a predetermined location in proximity to the selected parking spot. In embodiments, the system may be further configured to support a second driving mode for terminal guidance of the vehicle into the parking spot. In embodiments, the second driving mode may include recognition of predetermined guidance markers or signals associated with the available parking spot. In embodiments, the first driving mode may direct the vehicle to a parking garage entrance, and the second driving mode may navigate the vehicle within the parking garage to the selected parking spot.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention claimed. The detailed description and the specific examples, however, indicate only preferred embodiments of the invention. Various changes and modifications within the spirit and scope of the invention will become apparent to those skilled in the art from this detailed description.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced. In the drawings:

FIGS. 6A-6D depict a vehicle being parked by an automated vehicle parking system, according to another exemplary embodiment of the present disclosure.

FIG. 7 is a diagram showing exemplary control conditions that may be used by an automated vehicle parking system, according to another exemplary embodiment of the present disclosure.

DETAILED DESCRIPTION

Figure 1:
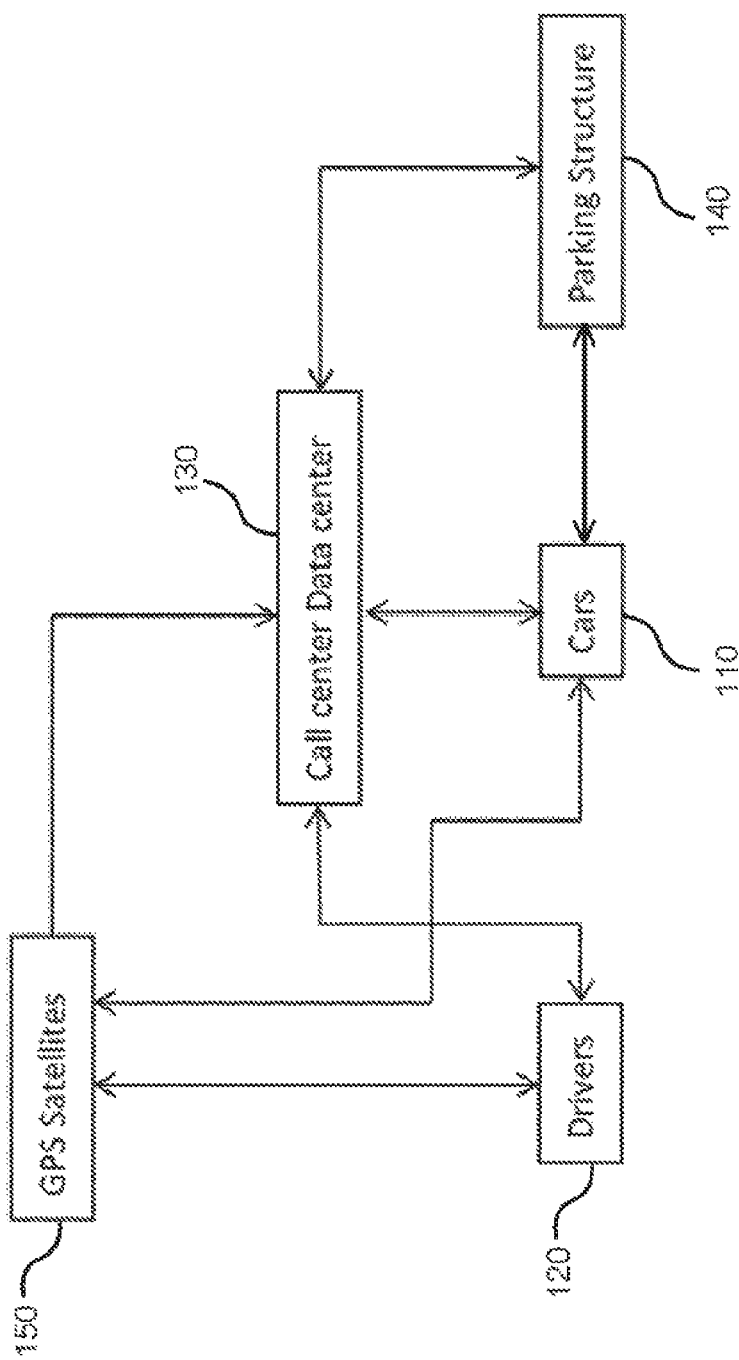
FIG. 1 is a schematic diagram of various elements that may be used in an automated vehicle parking system, according to an exemplary embodiment of the present disclosure.

Various example embodiments of the present disclosure will be described below with reference to the drawings constituting a part of the description. It should be understood that, although terms representing directions are used in the present disclosure, such as "front", "rear", "upper", "lower", "left", "right", and the like, for describing various exemplary structural parts and elements of the present disclosure, these terms are used herein only for the purpose of convenience of explanation and are determined based on the exemplary orientations shown in the drawings. Since the embodiments disclosed by the present disclosure can be arranged according to different directions, these terms representing directions are merely used for illustration and should not be regarded as limiting. Wherever possible, the same or similar reference marks used in the present disclosure refer to the same components.

Unless defined otherwise, all technical terms used herein have the same meanings as commonly understood by one of ordinary skill in the art to which the invention pertains. The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law. Moreover, it is noted that like reference numerals reference similar parts throughout the several views of the drawings.

FIG. 1 is a schematic diagram of various elements that may be used in an automated vehicle parking system, according to an exemplary embodiment of the present disclosure. As shown in FIG. 1, one or more cars 110 may be associated with drivers 120, e.g. via Bluetooth or other connection between a portable computing device of the drivers 120 with navigation, entertainment and/or control systems of their respective cars 110. The drivers 120 and/or cars 110 may be in communication with a call center/data center 130, which operates as a hub for processing requests for automated parking in certain embodiments.

Call center/data center 130 may include a communication interface, e.g. cellular, Internet, or other network connection that is configured to exchange information with drivers 120, cars 110, parking structures 140, GPS satellites 150, and/or any other navigation or location detecting system. Call center/data center 130 may include one or more computer servers with associated CPUs, input/output devices, memory and storage. Various applications, such as an automated parking program discussed herein, may be provided via a server interface running in memory and accessing various content in memory. In various embodiments, call center/data center 130 may be a computer system or other system owned or operated by a service provider, a municipality, an airport, a parking garage, etc. In some cases, the call center/data center 130 may interact with various municipal and/or commercial entities (generally represented by parking structure 140) to determine available parking options for a user in a given area, and can coordinate necessary information exchange, reserve parking spaces, guide the vehicle to the reserved spot, initiate parking fee payments, confirm that a vehicle has parked in the reserved spot, etc.

Those skilled in the art will appreciate that computing systems associated with drivers 120 (e.g. smart phones, tablet computers, vehicle controllers, etc.), cars 110 (e.g. entertainment, navigation, and/or control systems) and call center/data center 130 (e.g. computer servers, storage, databases, etc.) are merely illustrative and are not intended to limit the scope of the present subject matter. Such computing system may be connected to other devices that are not illustrated, including through one or more networks such as the Internet or via the web. More generally, a "computing device" may comprise any combination of hardware or software that can interact in the indicated manners, including computers, network devices, internet appliances, PDAs, wireless phones, pagers, electronic organizers, and various other consumer products that include inter-communication capabilities. In addition, the functionality provided by the illustrated system components may in some embodiments be combined in fewer components or distributed in additional components. Similarly, in some embodiments the functionality of some of the illustrated components may not be provided and/or other additional functionality may be available.

The call center/data center 130 may be configured to receive a parking request from a user such as driver 120 or via car 110. The parking request may include location information for the driver 120 or car 110, which may be calculated on GPS signal information received from GPS satellites 150, or in any other manner known in the art, such as triangulation, near-field communications, etc.

The call center/data center 130 may include an application, hardware and/or software module that is configured to determine parking space availability based on input from parking structures 140, or other information sources such as municipal cameras, and other sensor data. The received information can be associated with, or used to determine, parking spot availability in various ways. For example, image data from cameras can be compared to reference images to determine whether a vehicle is in one or more parking spaces, radio, sound and/or non-visible light may be used to determine if an object (i.e. a vehicle) is in a parking spot, weight sensors may detect a weight in excess of a threshold indicating the presence of a vehicle, etc.

The call center/data center 130 may include one or more processors and/or software instructions that identify an available parking spot based at least in part on location information associated with a parking request (e.g. the location of a requesting cell phone, vehicle navigation system, etc.) and information associated with specific parking spot availability, such as location information for one or more parking structures and information that indicates, directly or indirectly, that a given parking space is vacant. In embodiments, the information associated with parking spot availability may include at least one of images, sound waves, radio waves, and/or non-visible light waves that indicate the presence or absence of a vehicle in a parking space.

In some examples, a parking structure may determine independently that certain parking spaces are available, and send identifying information to the call center/data center 130, on a routine or triggered basis, or in response to a specific request that may be generated for a given parking request. For example, the call center/data center 130 may maintain an ongoing record of available parking spaces based on periodic and/or triggered updates from all of the parking structures, allowing for rapid determinations of parking space availability, or the call center/data center 130 may determine an appropriate area based on a given request, and query any structures within a predetermined distance of the requesting user's location. The call center/data center 130 may also analyze raw data, e.g. video or other sensor feeds to independently determine parking space availability in a certain area.

In embodiments, the call center/data center 130 may be further configured to send information associated with the available parking spaces to the requesting user. This can be done via various communication protocols, e.g. via an application running on a user device and/or vehicle system, and can include various data, such as location information, price information, distance information, hours of operation, and any other information about a parking spot/structure that the user may find helpful in deciding where to park.

In embodiments, the user and/or vehicle device may display parking options for the user based on the information associated with the available parking spaces received from the call center/data center 130. This can include, for example, a map with available parking spaces and/or structures, a map with available parking structures, a list of available parking spaces sorted by distance, price or other factors, etc.

In embodiments, the call center/data center 130 may be further configured to receive a parking confirmation for a selected parking spot from the driver 120 and/or car 110. This may be based on the user's selection of a given parking spot and/or structure via the interface on the user and/or vehicle device. The call center/data center 130 may also change a status of the selected parking spot to unavailable, which may include setting a flag or otherwise changing a data field in their own database, and/or communicating such information to a parking structure 140. In some examples, the parking spot "reservation" may be limited in time such that, if the vehicle does not occupy the parking space after a given period of time, the reservation is removed, and any instructions operable to guide the vehicle to the space are canceled or interrupted.

In embodiments, the call center/data center 130 may be further configured to send guidance information for automatically driving a vehicle at least partly to the selected parking spot. This may include, for example, sending GPS coordinates that the auto-navigation of the vehicle may use to drive to a parking structure entrance in a first mode that uses a first set of sensors and processing to navigate on identified roads. It should be appreciated that this information may be sent to the requesting user's personal device, and downloaded by the user onto a vehicle navigation system. This information can also include cryptographic or other keys that the system provides to the requesting user, that can be transferred to, and used by, the vehicle to authenticate with local systems in parking structure 140.

It should be appreciated that the various requests, analyses, and responses described above can be distributed among the components depicted in FIG. 1 in myriad ways, without departing form the scope of the disclosure. For example, as smartphones and/or vehicle control systems achieve in greater computing and communication power, various of the functions described as taking place at the call center/data center 130 may be offloaded to client devices, which may then interact directly with local systems such as individual smart parking meters, etc.

Figure 2:
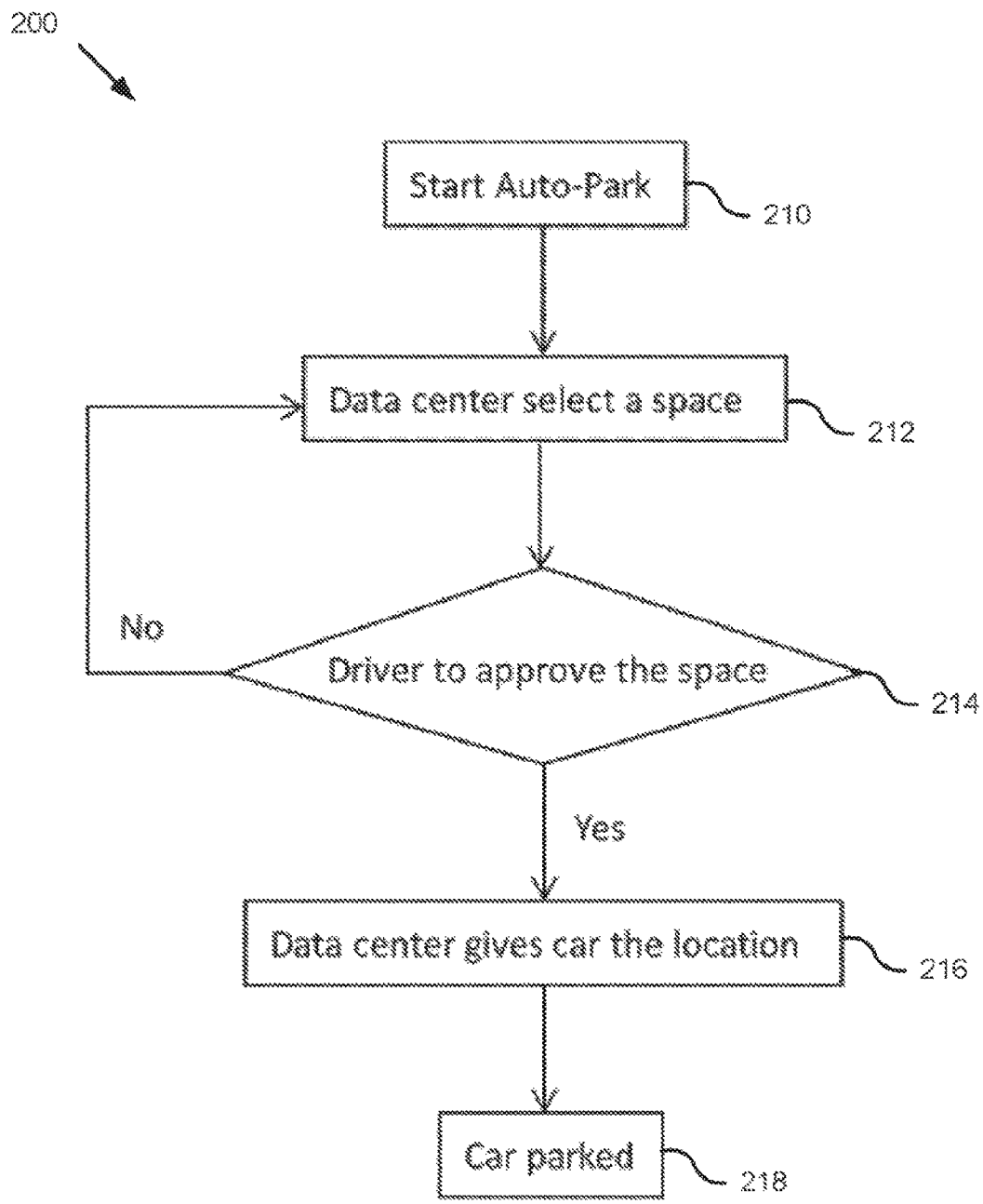
FIG. 2 is a process flow depicting aspects of an automated vehicle parking method, according to another exemplary embodiment of the present disclosure.
Figure 3:
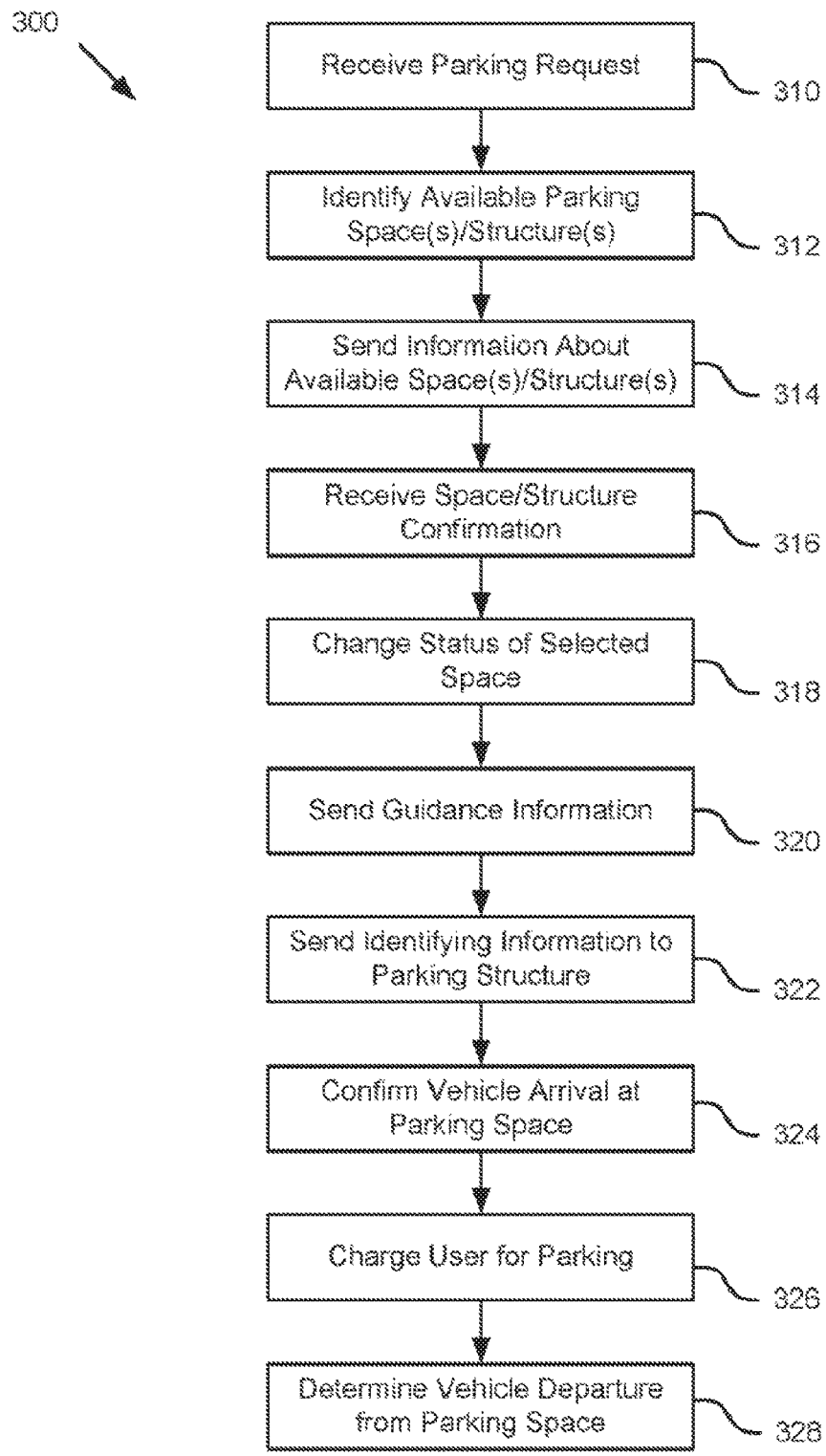
FIG. 3 is another process flow depicting aspects of an automated vehicle parking method from the perspective of a control server, according to another exemplary embodiment of the present disclosure.
Figure 4:
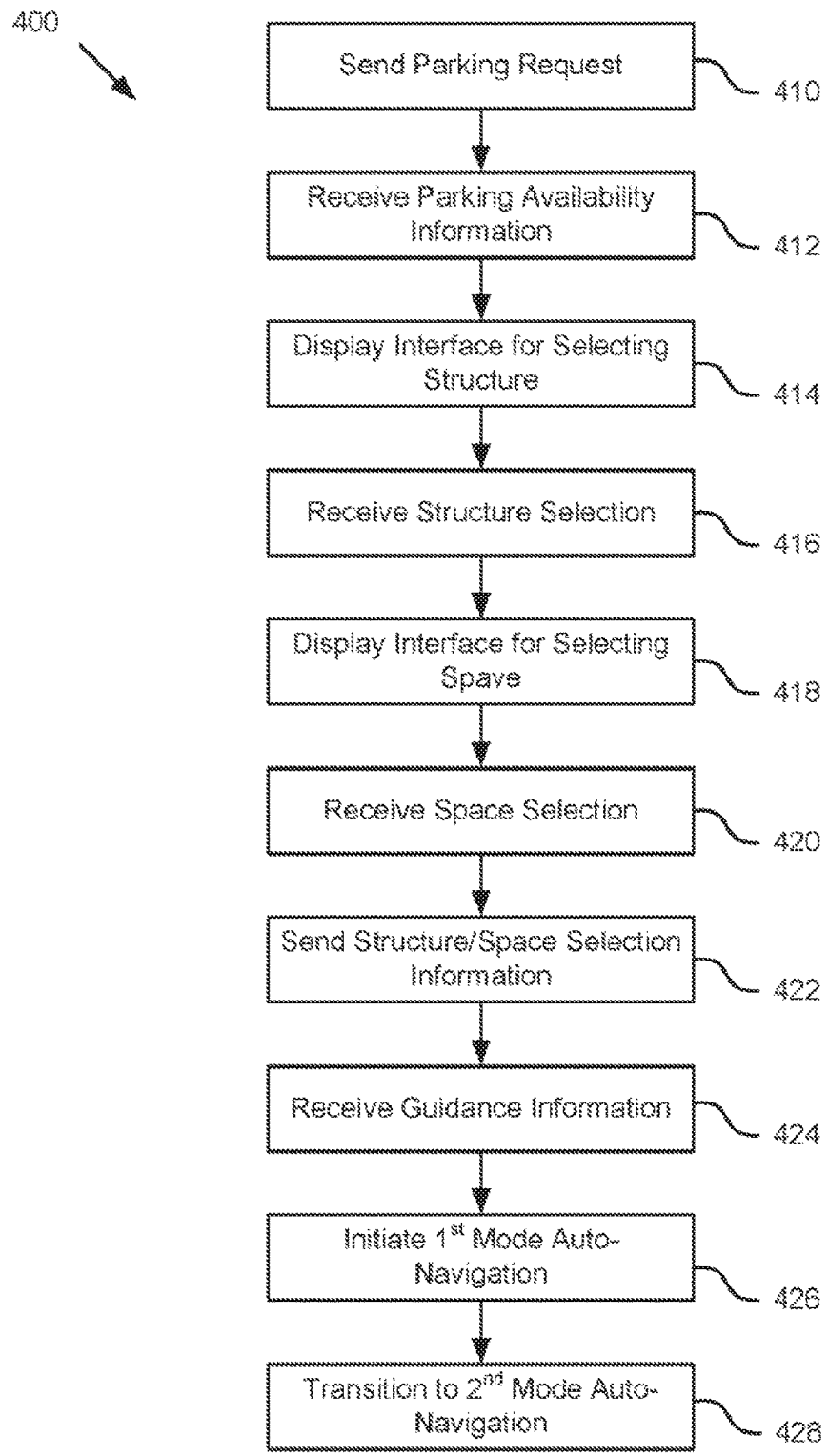
FIG. 4 is another process flow depicting aspects of an automated vehicle parking method from the perspective of a user device and/or vehicular system, according to another exemplary embodiment of the present disclosure.

FIGS. 2-4 depict various process flows according to aspects of automated vehicle parking methods of the present disclosure. Each operation depicted therein may represent a sequence of operations that can be implemented in hardware or computer instructions implemented in hardware. In the context of computer instructions, the operations represent computer-executable instructions stored on one or more computer-readable storage media that, when executed by one or more physical processors, perform the recited operations. Generally, computer-executable instructions include routines, programs, objects, components, and the like that perform particular functions or implement particular data types. The order in which the operations are described is not intended to be construed as a limitation, and any number of the described operations can be combined in any order and/or in parallel to implement the processes. Additionally, any specific reference to one or more operations being capable of being performed in a different order is not to be understood as suggesting that other operations may not be performed in another order.

FIG. 2 is a process flow depicting aspects of an automated vehicle parking method, according to another exemplary embodiment of the present disclosure. As shown in FIG. 2, process flow 200 may begin with a user initiating an auto-park process in 210. This can include, for example, activating an application on a personal computing device, activating a parking system incorporated in a vehicle, or even using an auto-park function included in a vehicle key or other control device. In some examples, 210 may include sending the request to a data center, such as call center/data center 130 shown in FIG. 1. The request may include a user and/or vehicle identifier, and location information for the user and/or vehicle. In some examples, user preferences may be embedded in the parking request and/or may be stored by the call center/data center 130 in a user preference file, or the like. Such preferences may include, for example, security requirements, blacklisted parking structures and/or areas, price limits, or any other preferences that the user finds helpful in pre-screening parking options.

The flow may continue with 212, in which the data center determines any spaces that are available, e.g. based on the user's location and any other relevant parameters, and sends information related to the available spots/structures to the requesting user. This can include, for example, location information, price information, distance information, hours of operation, image/video information, and any other information about a parking spot/structure that the user may find helpful in deciding where to park. This information may be interpreted by the application running on the client device, and presented to the user in various ways, such as maps, sorted lists, etc.

The flow may continue with decision point 214, in which a determination is made regarding whether the user has approved (e.g. selected) a given parking space and/or structure. In some cases, a user may only be presented with a list/map of available structures, without requiring the user to select a particular spot in that structure. In such cases, the system may automatically assign a spot within a selected structure. In other cases, the user may be given an interface that allows them to select specific parking spaces, which may include image and/or map data for one or more available spots.

If 214 indicates that no approval has been received, the flow may return to 212 and the system can wait for a response, suggest other possible alternatives and/or update the parking space availability based on new availability information received. As such, users can be given a virtually real-time view of parking spaces that become available in a given area, and can reserve such spaces for automatic parking as they become available.

If 214 indicates that an approval has been received, the flow may continue with 216, in which the data center provides the requesting user and/or associated vehicle with location information for the selected parking space/structure. This may include various combinations of data, from basic GPS coordinates, to detailed route and parking instructions. For example, in cases where the onboard navigation system of the vehicle is configured to direct the vehicle to a GPS coordinate, the information may be appropriately limited. However, in other cases, such as where the vehicle requires route information, or there is information specific to the parking space/structure that the navigation will need to park the vehicle, a more robust information package may be sent in 216.

The flow may continue with 218, in which the vehicle is automatically driven to, and parked in, the selected parking space. Successful completion of the automated parking process may be detected in various ways, such as cameras or other sensors in the parking space, GPS or other location calculations for the vehicle, and combinations thereof. As described further herein, successful completion of the automated parking process may also trigger various actions, such as sending the requesting user a confirmation message and/or photograph, charging the requesting user a parking fee, etc.

FIG. 3 is another process flow depicting aspects of an automated vehicle parking method from the perspective of a control server, according to another exemplary embodiment of the present disclosure. As shown in FIG. 3, process flow 300 may begin with a parking request being received, e.g. at the call center/data center 130. The request may include a user and/or vehicle identifier, and location information for the user and/or vehicle.

The flow may continue with 312, in which the data center determines any spaces and/or parking structures that are available, e.g. based on the user's location and any other relevant parameters.

The flow may continue with 314, in which the data center sends information related to the available spots/structures to the requesting user. This can include, for example, location information, price information, distance information, hours of operation, image/video information, and any other information about a parking spot/structure that the user may find helpful in deciding where to park.

The flow may continue with 316, in which a confirmation for a selected space and/or parking structure are received.

The flow may continue with 318, in which the status of the selected parking space is changed to unavailable. This may be done locally by the data center, e.g. if they have exclusive control of the automated parking in a given structure, or the status information may be shared in substantially real-time with a parking garage or any other entity that may have access to the parking garage.

The flow may continue with 320, in which guidance information may be sent to the requesting user and/or associated vehicle. As described previously, such information may include various combinations of data, from basic GPS coordinates, to detailed route and parking instructions. In some examples, this may include information sufficient to navigate the vehicle to a particular spot in a multi-level parking structure, or it may be more limited, e.g. to guide the vehicle to a "hand-off" point, where a localized terminal navigation protocol is implemented.

In some examples, systems may be configured to analyze an actual picture of the parking space and surrounding, and to determine at least part of the guidance information based on the analysis, e.g. the route into the parking spot, the clearances on either side, etc.

The flow may continue with 322, in which information identifying the vehicle may be sent to the selected parking structure and/or parking navigation aid. This may be used, for example, when the selected parking space and/or structure has a localized terminal navigation system that will synchronize with the vehicle's auto-navigation system in order to park the vehicle. For example, the selected parking space and/or structure may have one or more sensors and/or beacons that can be turned on and/or adjusted to communicate with the vehicle when parking is imminent, e.g. by near-field communication, response to predetermined signaling, etc. In order to effectuate such processes, it may be beneficial for the parking structure and/or parking navigation aid to have identifying information for the vehicle. In some examples, this may include one or more of a network address associated with the vehicle, a transmission code associated with the vehicle, a cryptographic or other key associated with the vehicle, etc.

The flow may continue with 324, in which successful completion of the automated parking process may be determined. This may be determined in various ways, such as using cameras or other sensors in the parking space, GPS or other location calculations for the vehicle, and combinations thereof. It should be noted that, in some examples, parking structures may control access such that only registered vehicles will be allowed to enter, thereby minimizing or eliminating the possibility of someone taking the selected parking space before the vehicle arrives. However, in some examples, e.g. in less controlled areas such as street or public pay parking, there is the possibility that the selected spot may be taken before the vehicle arrives. Therefore, systems and methods described herein may also provide for a rerouting function whereby the vehicle may be redirected enroute if the selected parking space is taken by someone else. This may be implemented in various ways including monitoring the location of the vehicle and the status of the selected parking space. If the status of the parking space changes to occupied, e.g. based on detecting another vehicle in the space, before the user's vehicle arrives at the parking spot and/or the parking structure, then the system may calculate a nearest available space and send new guidance information to the vehicle, as was done in 320. In some examples, the user may be sent an update alerting them to the change, or may be presented with a new selection interface to pick an alternate parking space. In some example, a "holding pattern" command may be sent to the vehicle, e.g. to have it loiter by driving a designated circle until new guidance information is communicated.

The flow may continue with 326, in which the user may be charged for the parking service. As mentioned above, the processes described in this and other flows included in the disclosure do not necessarily require every step, and do not require a specific order of completion. This is particularly true with respect to the point at which the user is charged for the parking service. In some examples, the individual vendor may set the point at which the user is charged, or the user may be charged when the parking reservation is confirmed, when the vehicle is parked in the parking space, and/or when the vehicle leaves the parking space.

The flow may continue with 328, in which the departure of the vehicle from the space is determined. This determination can be made based on similar factors to those used in determining the successful parking of the vehicle in the space, and can be used for various purposes such as calculating the total charge for the parking, changing a status of the parking space back to "available," etc.

FIG. 4 is another process flow depicting aspects of an automated vehicle parking method from the perspective of a user device and/or vehicular system, according to another exemplary embodiment of the present disclosure. As shown in FIG. 4, process flow 400 may begin with sending a parking request, e.g. from a user or vehicle device to the call center/data center 130. The request may include a user and/or vehicle identifier, and location information for the user and/or vehicle, which may be determined by GPS or any other automated location determining methodology.

The flow may continue with 412, in which information related to available spots/structures are received by the requesting user. This can include, for example, location information, price information, distance information, hours of operation, image/video information, and any other information about a parking spot/structure that the user may find helpful in deciding where to park.

Figure 8:
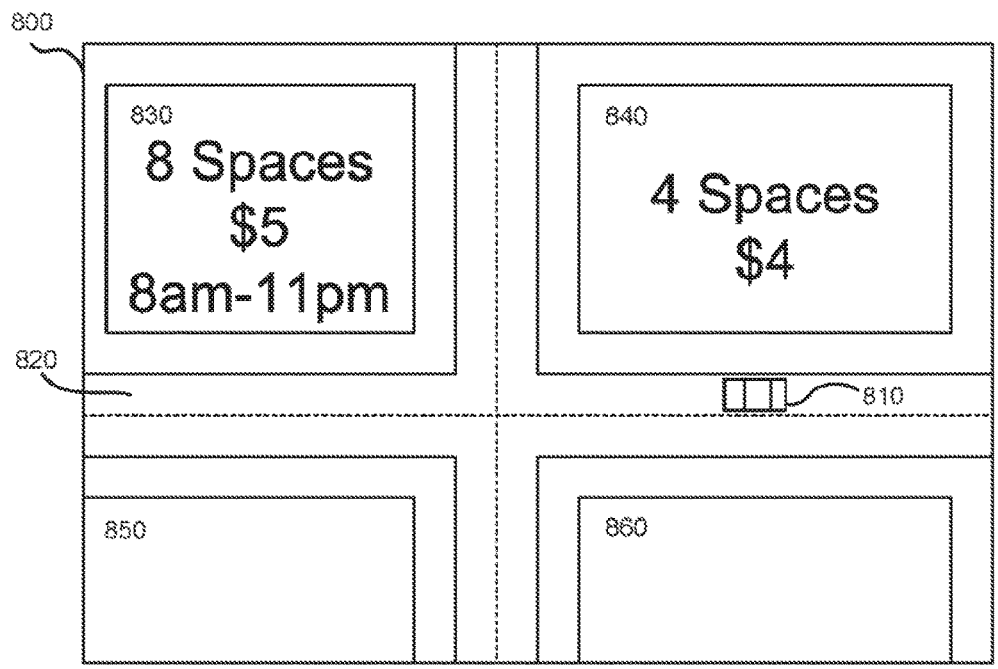
FIG. 8 is an exemplary graphical user interface for an automated vehicle parking system, showing available parking structures on a map, according to another exemplary embodiment of the present disclosure.

The flow may continue with 414, in which an interface is displayed for selecting the desired parking structure. This may include, for example, a map (such as shown in FIG. 8), a sorted list, or any other display conducive to allowing the user to view information about the parking structures and select a desired location. In some examples, the display may include one or more of parking facility information, price information, distance information, availability timing information, etc.

The flow may continue with 416, in which selection of a particular parking structure may be received. This may be accomplished in various ways, such as the user pressing a portion of a touch screen display corresponding to the parking structure, selection of a hard key corresponding to the desired parking structure, voice commands identifying the parking structure, etc. In some examples, the user may simply be able to force a selection based on user preferences and/or voice commands for one or more specific criteria, such as "pick the least expensive garage within 1 mile" or "pick the closest garage." In cases where the user merely needs to select a parking facility, without picking a specific parking space, the flow may simply skip 418-420, and proceed to sending the structure selection in 422. However, in some cases the user may be allowed to select a specific parking space, which can be accomplished by proceeding with 418.

Figure 9:
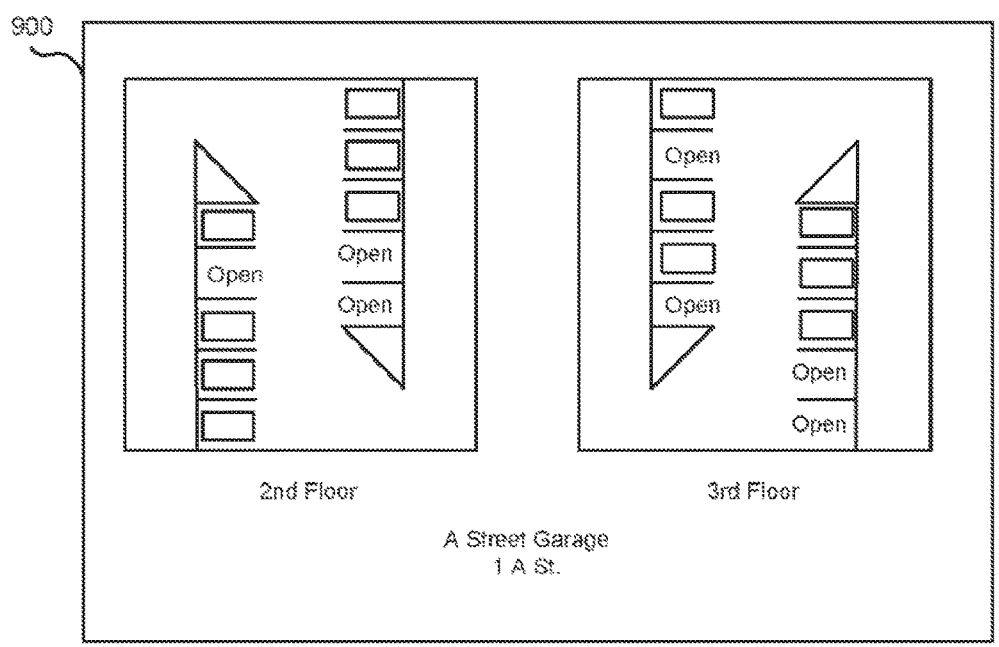
FIG. 9 is another exemplary graphical user interface for an automated vehicle parking system, showing available parking spaces on a map, according to another exemplary embodiment of the present disclosure.

In 418 an interface for selecting a specific space may be displayed (such as shown in FIG. 9). In some examples, the interface may include a street view, or a 3-dimensional representation of a multi-level parking structure, with available parking spaces highlighted. In some examples, the interface may include actual images captured from the parking space location, allowing the user to better understand the conditions of the parking spot. In some examples, the interface may include a sorted or unsorted list of available spaces with relevant information such as cost, distance, etc.

The flow may continue with 420, in which a confirmation for a selected space is received. This may be accomplished in various ways, such as the user pressing a portion of a touch screen display corresponding to the parking space, selection of a hard key corresponding to the desired parking space, voice commands identifying the parking space, etc. In some examples, the user may simply be able to force a selection based on user preferences and/or voice commands for one or more specific criteria, such as "pick the least expensive space within 1 mile" or "pick the closest space."

The flow may continue with 422, in which the structure and/or space selection may be sent, e.g. to the call center/data center 130.

The flow may continue with 422, in which guidance information may be received by the requesting user and/or associated vehicle. As described previously, such information may include various combinations of data, from basic GPS coordinates, to detailed route and parking instructions. In some examples, this may include information sufficient to navigate the vehicle to a particular spot in a multi-level parking structure, or it may be more limited, e.g. to guide the vehicle to a "hand-off" point, where a localized terminal navigation protocol is implemented.

The flow may continue with 426, in which a first mode of auto-navigation is initiated by the vehicle. In some examples, the vehicle user may set one or more parameters that allow initiation of the auto-navigation. For example, the user may be required to confirm initiation via an application on their smart phone or other control device, like a vehicle key. Automated cues may also be used, such as starting the auto-navigation after all occupants exit the vehicle, etc. In some examples, the first auto-navigation mode may use a first set of sensors to navigate the vehicle via known roadways to a position in proximity to the selected parking space/structure. These may include, for example, GPS, proximity sensors, cameras or other sensors used for autonomous vehicle driving.

The flow may continue with 428, in which a second mode of auto-navigation is initiated by the vehicle. In some examples, the parameters that cause initiation of the second mode of auto-navigation may be included in the guidance information or other information received by the vehicle when it arrives at a location in proximity to the selected parking space/structure. For example, a parking garage system may authenticate the vehicle when it arrives at the garage entrance and communicate terminal guidance information for navigating to the selected parking space to the vehicle. In some examples, the second auto-navigation mode may use a second set of sensors, or different sensor criteria, to navigate the vehicle that are different than those of the first auto-navigation mode. For example, radio receivers may be tuned to a specific radio beacon associated with the selected parking space, camera sensing may be tuned to specific line colors used in the garage, non-visible light sensors may be tuned to particular blink patterns and/or frequencies, etc. In some examples, the second mode of auto-navigation may be used to park the vehicle in a specific parking space.

Figure 5:
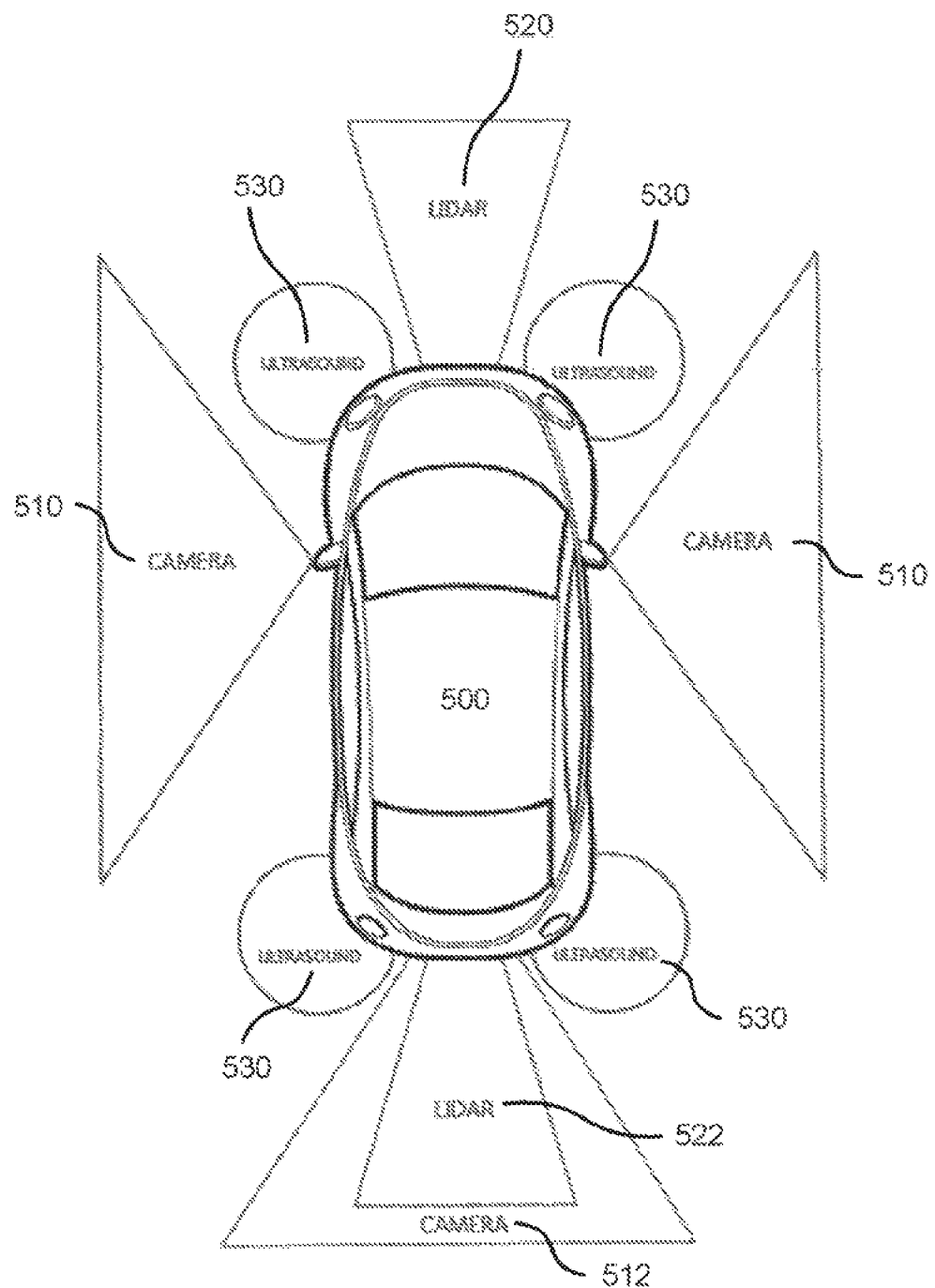
FIG. 5 is a diagram of a vehicle including various sensor elements that may be used in an automated vehicle parking system, according to another exemplary embodiment of the present disclosure.

FIG. 5 is a diagram of a vehicle including various sensor elements that may be used in an automated vehicle parking system, according to another exemplary embodiment of the present disclosure. As shown in FIG. 5, a vehicle 500 may include a plurality of sensor, transmitter and/or transceiver types including cameras 510, 512, proximity sensors such as LIDAR transceivers 520, 522 and/or ultrasound transceivers 530. The vehicle 500 may also include any manner of network transceiver, and/or transmitter (not shown), e.g. for communicating with user devices and/or identifying the vehicle to automated parking systems described herein. Any of the sensors shown in FIG. 5 may be communicatively coupled to a processor of an automated parking/navigation system included in the vehicle 500. Such communications may serve multiple purposes, such as providing driver-assist functions, proximity alarms, back-up camera view, etc. when a driver is operating the vehicle 500, and assisting with the automated navigation and parking of the vehicle when it is being driven by the auto-navigation system. As also shown in FIG. 5, each of the sensor/transceiver units typically have an effective range (distance and/or angle).

Figure 6A:
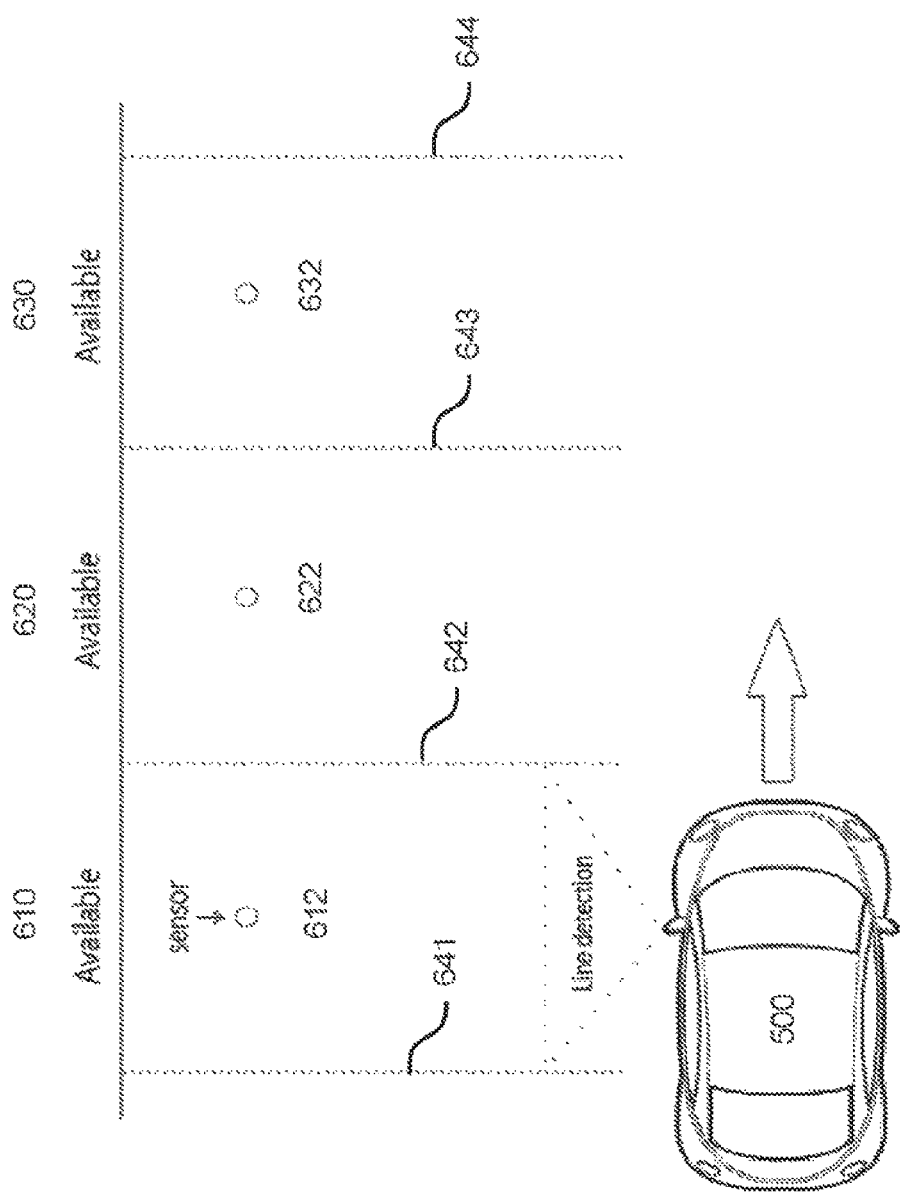

FIGS. 6A-6D depict a vehicle being parked by an automated vehicle parking system, according to another exemplary embodiment of the present disclosure. As shown in FIG. 6A, the vehicle 500 may be approaching a selected parking space 610. The spaces 610, 620, 630 may be located on a street, or in a multilevel parking garage. Spaces 610, 620, 630 may be defined by lines 641-644, which may be visible painted lines, visible and/or invisible light lines, or any other detectable line. Each of spaces 610, 620, 630 also has one or more corresponding sensors 612, 622, 632, which may be used by the automated parking system to assist vehicle 500 with locating and parking in the selected parking space.

In some examples, the vehicle 500 may be guided to a position proximate to parking space 610 in a first navigation mode, e.g. based on GPS and other navigation data. As shown in FIG. 6A, as the vehicle 500 approaches parking space 610, it may transition to a second navigation mode and use, for example, cameras, like 510 shown in FIG. 5, to detect lines 641, 642 or other visible indicia. The parking structure may also use any of sensors 612, 622, 632 to identify the vehicle 500 and/or confirm the vehicle's location within the parking structure. For example, the sensor 612 may detect an identifiable feature of vehicle 500 as it passes by, or may use various near-field interrogation techniques to identify vehicle 500. In some examples, the vehicle 500 may communicate with a terminal navigation system in order to park the vehicle in the selected space. For example, when the vehicle 500 is detected in the position shown in FIG. 6A, the terminal navigation system may communicate specific instructions for the vehicle 500 to execute, including sensor data, etc. In other examples, the system onboard the vehicle 500 may be more autonomous, and may be configured to execute the necessary parking maneuvers without specific guidance from a terminal navigation system.

Figure 6B:
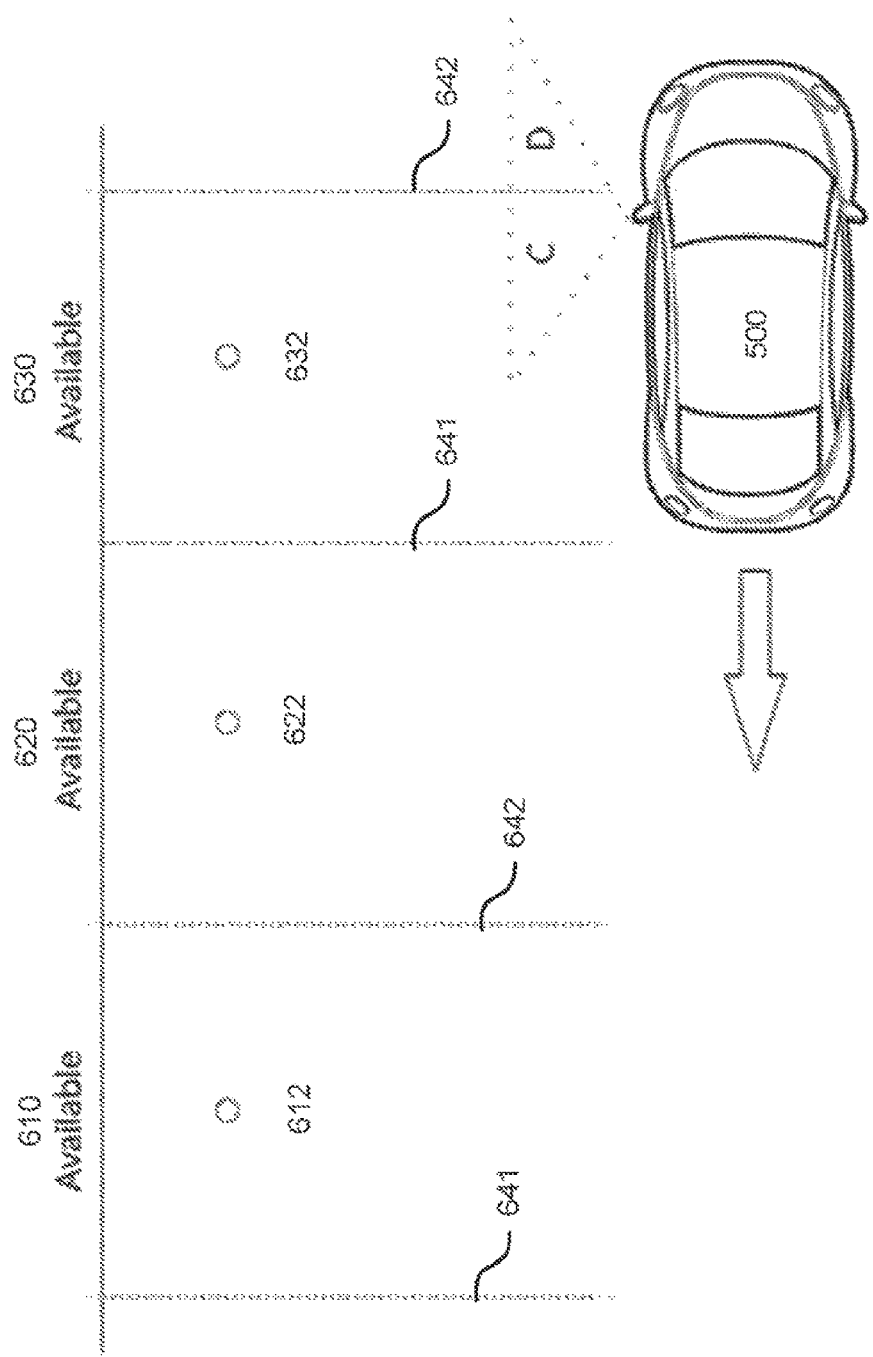

The vehicle 500 may pass the lines 641, 642 and transition to another position shown in FIG. 6B. As shown in FIG. 6B, the vehicle 500 reaches a point at which the automatic parking system determines a backing movement should begin. This may be based, for example, on passing additional line 641 and/or locating the vehicle 500 with respect to a specific line 642, e.g. via camera imaging and/or other sensing techniques. In some examples, vehicle position information, particularly in close maneuvering may be established using redundant sensors, such as multiple cameras, GPS and camera or other sensor data, near-field locating, LIDAR, etc.

Figure 6C:
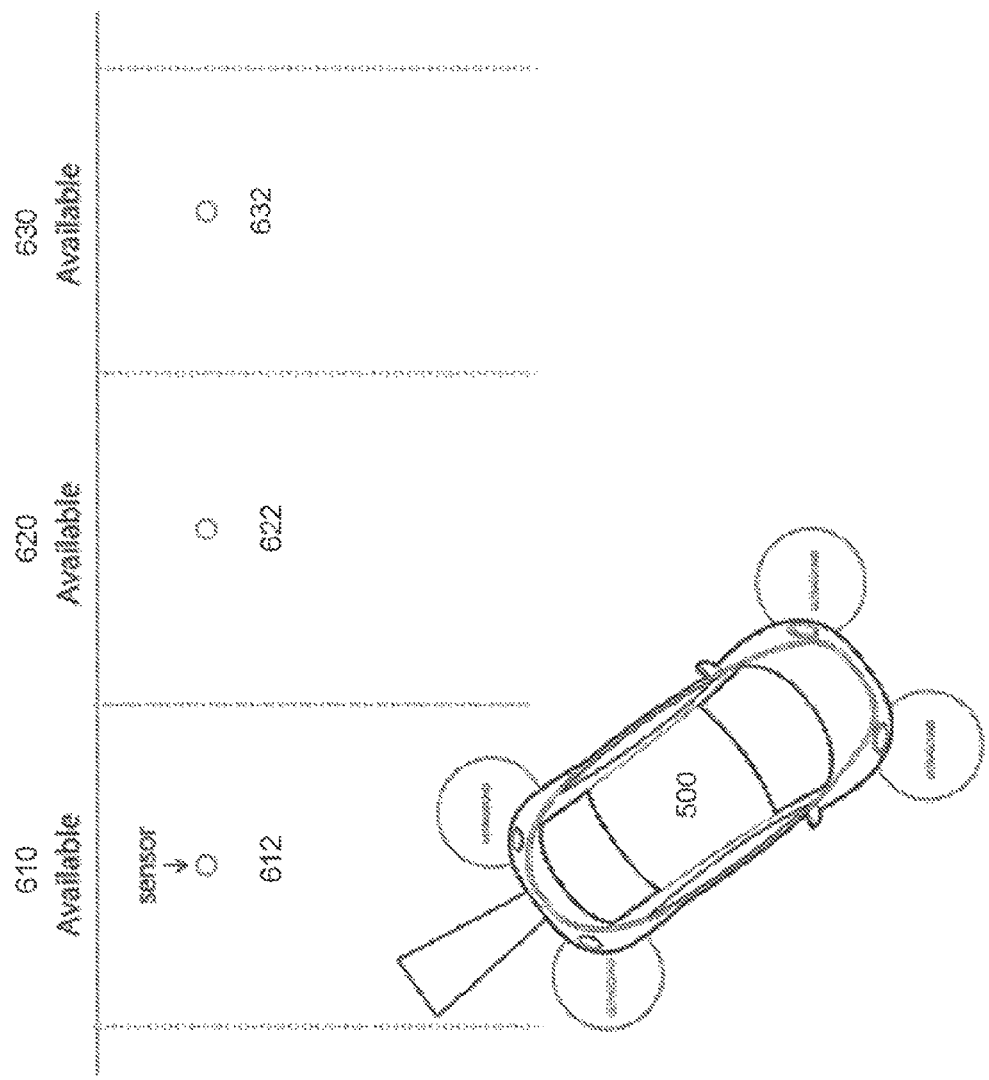

The vehicle 500 may continue backing up and transition to another position shown in FIG. 6C. As shown in FIG. 6C, the vehicle 500 begins turning into space 610 and actively monitors proximity detectors, such as ultrasound transceivers 530 and/or LIDAR 522, and may also use a camera, like 512, to assist with the final positioning of the vehicle 500 in the space 610. This may be based, for example, on monitoring movement of the vehicle 500, monitoring relative changes in the lines 641, 642, information exchanged with sensor 612, etc. In some examples, the ultrasound transceivers 530 (or similar sensors) may be used to ensure that, even though the vehicle is in the right location, there are not unexpected obstacles that impede the parking maneuver.

The vehicle 500 may continue backing up and transition to another position shown in FIG. 6D, in which the parking maneuver is completed. As shown in FIG. 6D, the vehicle 500 reaches a position in space 610 in which various sensors are used to confirm its proper alignment. For example, cameras 510 may compare relative angles of the lines 641, 642, LIDAR 522 may detect proximity to a back wall of the space, ultrasound detectors 530 may ensure that the vehicle has the proper standoff from any adjacent vehicles or objects, etc. In some examples, the status of the space 610 may be changed to unavailable once the requisite confirmation is complete (if not done so already).

FIG. 7 is a diagram showing exemplary control conditions that may be used by an automated vehicle parking system, for a backing maneuvers as shown in FIGS. 6A-6D. As shown in FIG. 7, algorithms for terminal guidance into a parking space may be based, for example, on the position of the desired parked wheel center line, the sidelines of the parking space, and the length between the right wheel center line and the sideline of the parking space (Lrr), and may be used to determine (among other criteria) the largest angle between the parked wheel center line and the backward direction (Rrr), and the last turn point for the right rear wheel (Prr).

FIG. 8 is an exemplary graphical user interface for an automated vehicle parking system, showing available parking structures on a map, according to another exemplary embodiment of the present disclosure. As show in FIG. 8, as part of an automated parking process a user may be presented with an interface 800, showing a vehicle location 810, roads 820, and structures 830, 840, 850, 860. The interface is modified based on available parking space information to include indicia that structures 830 and 840 have available parking spaces, i.e. 8 spaces in structure 830 and 4 spaces in structure 840. The interface 800 includes additional information, such as the parking prices in structures 830, 840 and the hours of operation of structure 830. Of course, a variety of relevant information may be presented depending, for example, on what information the system is able to obtain for the various parking options.

In some examples, the interface 800 may be presented on a user device, such as a smartphone, or the interface 800 may be presented on a vehicle's system. In any event, the user may select one of the available structures to confirm and/or proceed with an automated parking procedure. In some examples, such as where the user does not care to select a specific parking space, or where only one space is available in a given structure, selection of a structure (e.g. 830 or 840) may initiate the automated parking process. In other examples, the selection of a structure may initiate another interface, such as that shown in FIG. 9.

FIG. 9 is another exemplary graphical user interface for an automated vehicle parking system, showing available parking spaces on a map, according to another exemplary embodiment of the present disclosure. FIG. 9 depicts a multilevel parking structure with "Open" designations for available parking spaces. The user can select a specific parking space, e.g. by pressing the corresponding location on a touch screen, and initiate an automatic parking procedure that will park the vehicle in the selected parking space (or alternate space as described below).

In some examples, the interface 900 may be presented on a user device, such as a smartphone, or the interface 900 may be presented on a vehicle's system. In any event, the user may select one of the available spaces to confirm an automated parking procedure. Although FIGS. 8 and 9 depict parking structures, available street parking spaces may also be identified, e.g. by cameras in parking meters or other sensors, and presented to the user for selection. As mentioned previously, in cases where access to a selected parking space is not controlled, e.g. public street parking, exemplary systems may be configured to reroute a vehicle to an alternate space if someone takes the selected space whilst the vehicle is enroute.

In some examples, the user application may provide a navigation application that directs the user to the parked vehicle. This may be based, for example, on the location of the parked vehicle and/or information about the parking structure. In some examples, the user interface may allow for the user to instruct the vehicle to leave the parking structure and return to the entrance or the user's location. In cases where the vehicle is instructed to return to the entrance of the parking structure, a process similar to that used to park the vehicle may be reversed, and the vehicle can autonomously return to the entrance. In cases where the vehicle is instructed to return to the user's location, a two-step process may be employed wherein (1) the process used to park the vehicle is reversed, and (2) after the vehicle returns to the entrance of the parking structure, a road navigation route is executed to deliver the vehicle to the user's location (determined by GPS or other technique).

As will be appreciated considering the foregoing description, the present subject matter allows for full three-dimensional (3D) parking for vehicles, whereby a driver can simply leave the vehicle at front of a store, restaurant or other location, and have the vehicle automatically park itself. Although the foregoing descriptions involve an exemplary back-in procedure, it should also be appreciated that the present subject matter can be adapted to various parking techniques, including S-shaped parking maneuvers (such as a parallel parking along road side), or a "front-in" L-shaped parking maneuver.

In some examples, all of the logic performed by the automated parking process can be performed by random access memory (RAM), avoiding the need to access databases, which can unduly slow the process. This is particularly significant in the context of making an effective 3D system that has to use decision-making/AI/logic, and coordinate/deconflict between various users and/or parking structures in substantially real-time.

Although the present disclosure has been described with reference to the specific embodiments shown in the drawings, it should be understood that the lightweight fastening methods provided by the present disclosure can have a variety of variations without departing from the spirit, scope and background of the present disclosure. The description given above is merely illustrative and is not meant to be an exhaustive list of all possible embodiments, applications or modifications of the invention. Those of ordinary skill in the art should be still aware that, parameters in the embodiments disclosed by the present disclosure can be changed in different manners, and these changes shall fall within the spirit and scope of the present disclosure and the claims. Thus, various modifications and variations of the described methods and systems of the invention will be apparent to those skilled in the art without departing from the scope and spirit of the invention.

What is claimed is:

1. A method of automatically parking a vehicle, comprising:

receiving a request from a user to automatically park a vehicle, the request including location information;

determining an available parking space based on location information;

generating guidance information related to the available space for execution by the vehicle, wherein the guidance information is configured to assist the vehicle to park itself in the available parking space without intervention by the user;

receiving parking line information from the vehicle, the parking line information including information regarding a side line of the available parking space;

determining that the vehicle has reached a predetermined point such that the vehicle may enter the available parking space;

generating instruction for execution by the vehicle instructing the vehicle to enter the available parking space; and determining that the vehicle has parked in the available parking space based on the parking line information, wherein determining that the vehicle has parked in the available parking space based on the parking line information comprises:

determining a largest angle between the right wheel center line and the side line of the available parking space; and determining a last turn point for a right rear wheel of the vehicle.

2. The method of claim 1, wherein the location information includes GPS coordinates, and the search returns results within a predetermined distance of the GPS coordinates.

3. The method of claim 1, further comprising determine that the vehicle has reached a predetermined point such that the vehicle may enter the available parking space.

4. The method of claim 1, further comprising receiving updated parking line information from the vehicle and the determination that the vehicle has parked in the available parking space is further based on the updated parking line information.

5. The method of claim 1, wherein the guidance information includes at least one of coordinates associated with the available parking space, directions associated with the available parking space, communication link information for a local auto-guidance system associated with the available parking space, or sensor and/or beacon identification associated with the available parking space.

6. The method of claim 1, wherein the parking line information includes information indicating a length between a right wheel center line and the side line of the available parking space.

7. The method of claim 1, further comprising charging the user a parking fee based at least in part on determining that the vehicle has arrived at the available parking space, determining that the vehicle has left the available parking space, or the confirmation from the user that the vehicle is to be parked in the available parking space.

8. An automatic parking system, comprising:
a positioning system configured to determine the location of a vehicle;
a communication interface configured to receive available parking space information and guidance information for execution by the vehicle, wherein the guidance information is configured to assist the vehicle to park itself in an available parking space indicated by the available parking space information without user intervention;
a user interface configured to allow a user to select at least one of the available parking space; and
a guidance system configured to:
generate guidance information for automatically driving a vehicle to the parking space selected via the user interface, wherein the guidance information is configured to assist the vehicle to park itself in the selected parking spot without intervention by the user;
receive parking line information from the vehicle, the parking line information including information regarding a side line of the available parking space;
generate instruction for execution by the vehicle instructing the vehicle to enter the available parking space; and
determine that the vehicle has parked in the available parking space based on the parking line information, wherein determining that the vehicle has parked in the available parking space based on the parking line information comprises:
determining a largest angle between the right wheel center line and the side line of the available parking space; and
determining a last turn point for a right rear wheel of the vehicle drive, based on the received guidance information, the vehicle to the available parking space selected via the user interface.

9. The system of claim 8, wherein the communication system is further configured to transmit a parking request including location information of the vehicle.

10. The system of claim 8, wherein the guidance system includes a movement sensor, a plurality of cameras, and a sensor configured to detect at least one of sound waves, radio waves, or non-visible light waves.

11. The system of claim 8, wherein the guidance system is configured to operate in at least a first mode for road driving and a second mode for driving in a parking structure.

12. The system of claim 11, wherein the second mode includes interpreting a data category that is not used in the first mode.

13. The system of claim 8, driving the vehicle to the available parking space includes determining that the vehicle is in proximity to the available parking space based on the guidance information and in response to the determination that the vehicle is in proximity to the available parking space, activate a camera of the vehicle such that the vehicle is further driven based on images captured by the camera of the vehicle.

14. An automatic parking system, comprising:
a communication interface configured to receive a parking request from a user, the parking request including location information; and
a processor configured to:
determine an available parking space based on location information;
generate guidance information related to the available space for execution by the vehicle, wherein the guidance information is configured to assist the vehicle to park itself in the available parking space without intervention by the user;
receive parking line information from the vehicle, the parking line information including information regarding a side line of the available parking space;
determine that the vehicle has reached a predetermined point such that the vehicle may enter the available parking space;
generate instruction for execution by the vehicle instructing the vehicle to enter the available parking space; and
determine that the vehicle has parked in the available parking space based on the parking line information, wherein determining that the vehicle has parked in the available parking space based on the parking line information comprises:
determine a largest angle between the right wheel center line and the side line of the available parking space; and
determine a last turn point for a right rear wheel of the vehicle.

15. The system of claim 14, wherein the location information includes GPS coordinates, and the search returns results within a predetermined distance of the GPS coordinates.

16. The system of claim 14, wherein the guidance information is configured to allow the vehicle to be automatically driven in a first mode to a predetermined location in proximity to the selected parking spot, and the system is further configured to support a second driving mode for terminal guidance of the vehicle into the parking spot.

17. The system of claim 16, wherein the second driving mode includes recognition of predetermined guidance markers or signals associated with the available parking spot; and wherein the updated parking line information is received from the vehicle while the vehicle is in the second driving mode and includes information indicating a length between a right wheel center line and the side line of the available parking space.

* * * * *